L. V. SHEPHERD.
SQUARE.
APPLICATION FILED JAN. 6, 1908.
909,694.
Patented Jan. 12, 1909.
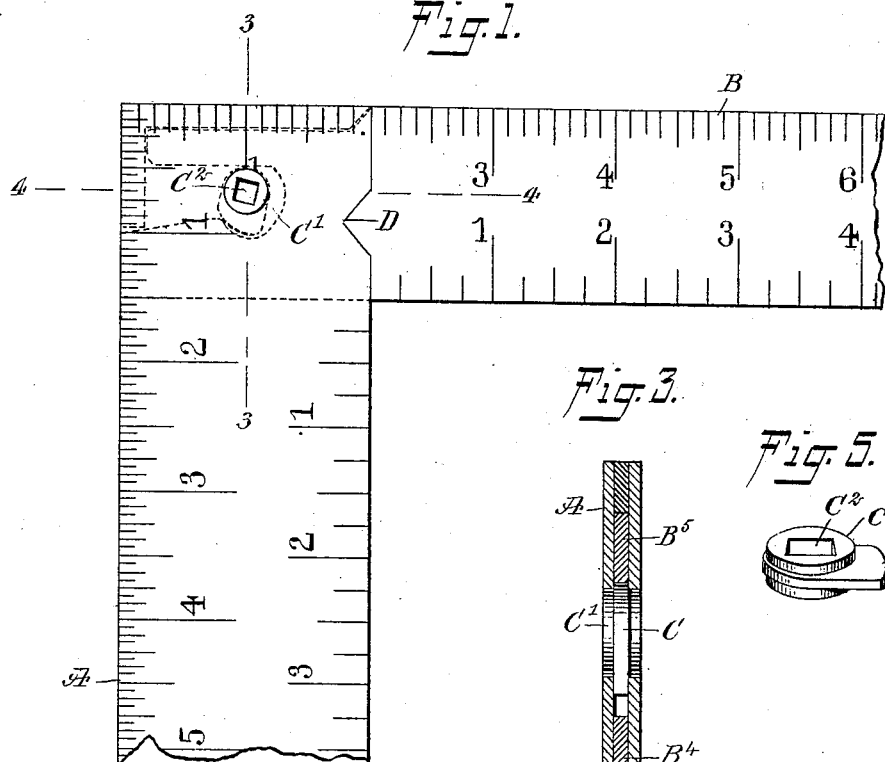
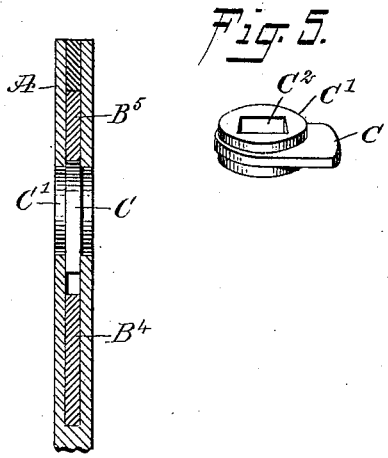
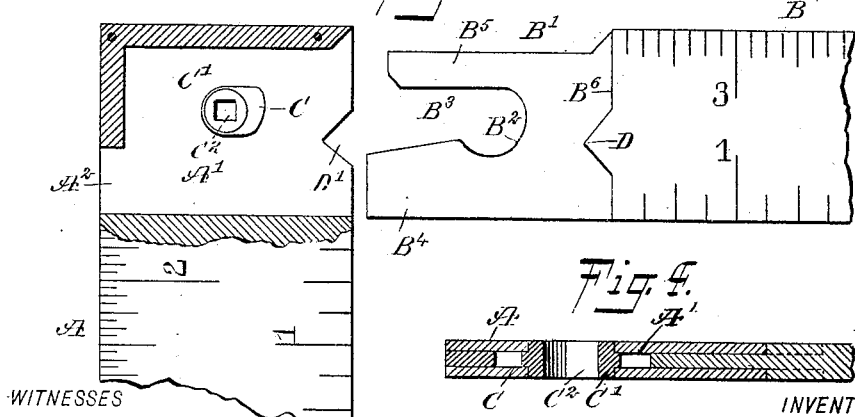
WITNESSES
INVENTOR
Lonell Verner Shepherd
BY
ATTORNEYS

UNITED STATES PATENT OFFICE.

LONELL VERNER SHEPHERD, OF LOS ANGELES, CALIFORNIA.

SQUARE.

No. 909,694.  Specification of Letters Patent.  Patented Jan. 12, 1909.

Application filed January 6, 1908. Serial No. 409,511.

To all whom it may concern:

Be it known that I, LONELL VERNER SHEPHERD, a citizen of the United States, and a resident of Los Angeles, in the county of Los Angeles and State of California, have invented a new and Improved Square, of which the following is a full, clear, and exact description.

The invention relates to squares, such as are shown and described in the Letters Patent of the United States, No. 847,208, granted to me March 12, 1907.

The object of the invention is to provide a new and improved square having its legs or members separably connected with each other to allow carpenters, machinists and other mechanics using the square to readily employ the same for its legitimate purposes, and to permit of detaching the members for carrying the same conveniently in a tool chest or the like.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a plan view of the improvement, showing the members assembled; Fig. 2 is a like view of the same, showing the members disassembled and part of one member in section; Fig. 3 is an enlarged transverse section of the improvement on the line 3—3 of Fig. 1; Fig. 4 is a similar view of the same on the line 4—4 of Fig. 1, and Fig. 5 is a perspective view of the locking cam.

The legs or members A and B of the square are separably connected with each other, and for this purpose the member A is provided at one end with a socket or a recess A' for the reception of a tongue B' formed at or projecting from one end of the other member B. In order to securely lock the tongue B' in position in the socket A' and to hold the member B accurately in a right-angled position relative to the member A, the following arrangement is made: Within the socket A' is contained a locking cam or lever C having a hub C' mounted to turn in suitable bearings arranged in the face walls of the socket A', the said hub C' being provided with a polygonal bore $C^2$, for engagement by a key or other tool, to permit the user of the square to turn the locking cam C. The locking cam C is adapted to engage the wall $B^2$ of a slot $B^3$, formed lengthwise in the tongue B' from the outer end thereof inwardly, as plainly shown in Fig. 2, so that when the tongue B' engages the socket A' and the cam C is turned from the position shown in Fig. 2, to that indicated in dotted lines in Fig. 1, then the locking cam C in engaging the wall $B^2$ draws the tongue B' into final position within the socket A' and locks it therein. By arranging the slot $B^3$ in the manner described and shown in Fig. 2, two fork members $B^4$ and $B^5$ are formed, of which the fork member $B^5$ is shorter than the fork member $B^4$ and is adapted to rest against the inner wall of the socket A', while the free end of the fork member $B^4$ is adapted to pass into an opening $A^2$ formed in the rear wall or back of the socket A'. By this arrangement the tongue B' fits snugly in the socket and is prevented from wabbling especially when finally locked in place by the cam C, as previously described. When it is desired to disengage the members A and B, it is only necessary for the operator to insert a key in the bore $C^2$ and turn the cam C into the position shown in Fig. 2, that is, parallel to the slot $B^3$, to allow of drawing the tongue B' out of the socket A'.

A V-shaped lug D is formed on each shoulder $B^6$ of the member B, and is adapted to engage a corresponding recess D' formed in the front edge of the socket A', to aid in holding the member B in an accurate right-angled position relative to the member A.

From the foregoing it will be seen that a carpenter, machinist or other person can readily disconnect the members A and B, so as to allow of conveniently carrying the square in a tool chest or the like, and the user can conveniently and accurately assemble the members to permit of making use of the square for its legitimate purpose.

Having thus described my invention, I claim as new and desire to secure by Letters Patent:

1. A square composed of detachable members, one of which is provided with a socket having openings in its side walls and the other with a tongue fitting into the socket, the tongue having a cam slot, and a locking cam within the said socket and having a hub from which the cam centrally projects, said hub being mounted to turn in the openings of the walls of the socket, the said cam engaging the said cam slot and the said cam hub having means for turning the cam to draw the tongue into final position and lock it therein.

2. A square composed of detachable members, one of which is provided with a socket and the other with a tongue fitting into the socket, the tongue having a cam slot, and a locking cam within the said socket and having a hub from which the cam centrally projects, said hub being mounted to turn in the walls of the socket, the said cam engaging the said cam slot and the said cam hub having a polygonal bore for engagement by a key to permit of turning the cam with a view to draw the tongue into final position and lock it therein.

3. A square composed of detachable members, one of which is provided with a socket and the other with a tongue fitting into the socket, the socket being wholly open at the entrance side and provided with a rectangular opening at the back, and the said tongue having a cam slot forming fork members, of which one is longer than the other and fits into the said back opening, and a manually-controlled locking cam within the said socket and engaging the said cam slot, the locking cam being mounted to turn in the face walls of the said socket.

4. A square composed of detachable members, one of which is provided with a socket and the other with a tongue fitting in the socket, and having members of unequal length, the socket being wholly open at the entrance side and provided with an opening at the back in which fits the longer member of the tongue, and means for locking the tongue in the socket.

In testimony whereof I have signed my name to this specification in the presence of two subscribing witnesses.

LONELL VERNER SHEPHERD.

Witnesses:
W. S. STEVENSON,
JOSIE M. SCOTT.